United States Patent Office 3,237,918
Patented Mar. 1, 1966

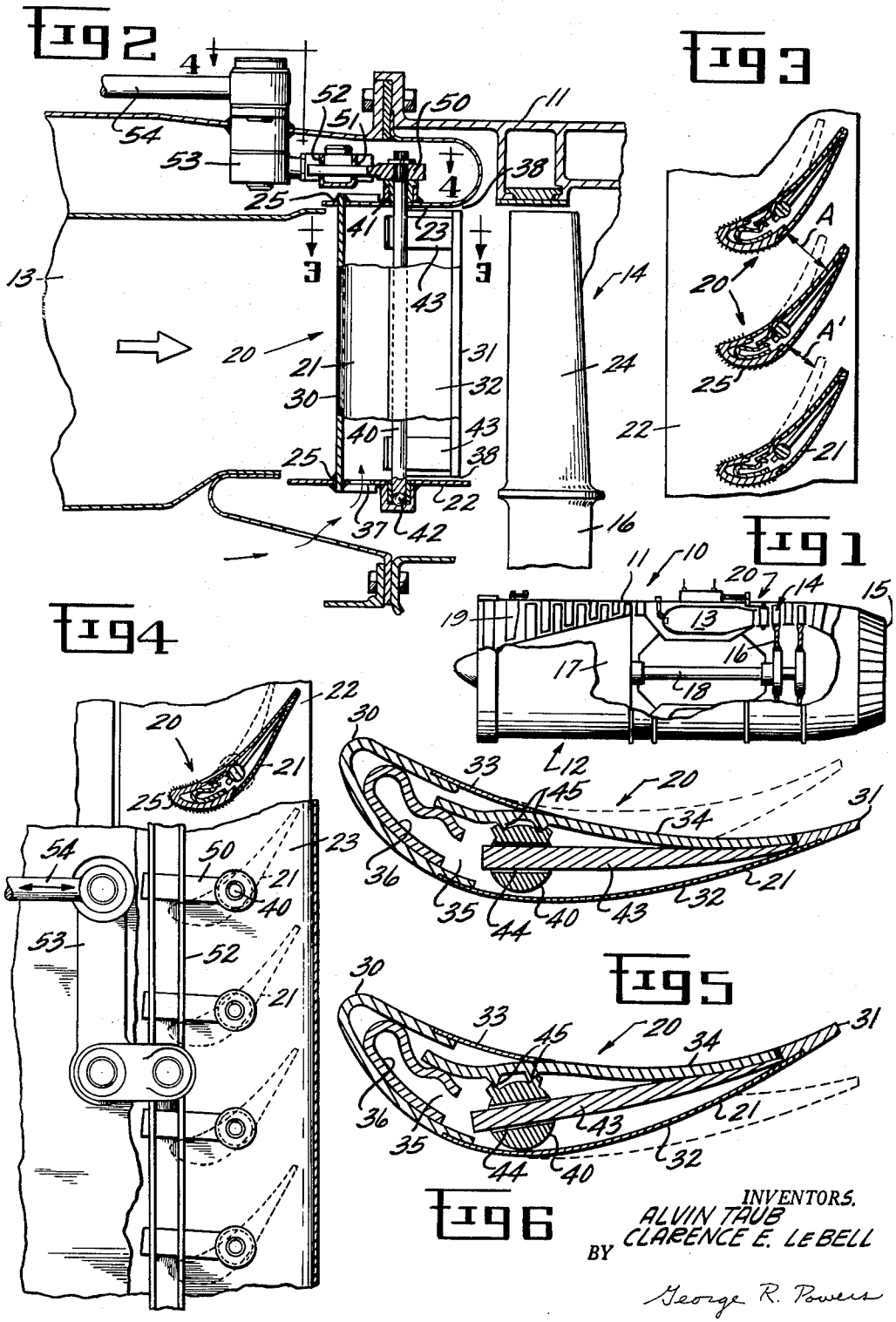

3,237,918
VARIABLE STATOR VANES
Clarence Edgar Le Bell, Peabody, and Alvin Taub, Wakefield, Mass., assignors to General Electric Company, a corporation of New York
Filed Aug. 30, 1963, Ser. No. 305,587
2 Claims. (Cl. 253—78)

This invention relates to stator structure for fluid flow machinery such as compressors and turbines and, more particularly, to a stator vane configuration which may be variably positioned to control the operating characteristics of the machine.

In a gas turbine engine, motive fluid is compressed in the engine compressor and directed downstream therefrom to a combustor. In the combustor, the energy of the motive fluid is increased greatly by the combustion process, and the resulting products of combustion are then directed downstream to a gas generator turbine which is mechanically coupled to and drives the compressor. After sufficient energy for the compression process is extracted by the gas generator turbine, the products of combustion are directed to either a jet nozzle or a power turbine. In a "turbojet" engine of the type commonly used for aircraft propulsion, the products of combustion are supplied to an exhaust nozzle as a high velocity jet, the velocity of the issuing jet providing the propulsive thrust. In engines of the type known as "turboshaft" engines, the products of combustion are supplied to a power turbine coupled by an output shaft to a driven load. Turboshaft engines in which the power turbine drives a propeller are also utilized for aircraft propulsion, such engines also being known as "turboprops" or "prop-jets."

It is well known that greater output thrust from a turbojet engine and greater shaft output horsepower from a turboshaft engine can be obtained by increasing the compression ratio of the compressor or, in other words, by compressing the motive fluid to a higher pressure. Therefore, in order to obtain more output from the engine at its maximum operating condition, it is desirable to have a high compression ratio compressor for the engine. However, when a high compression ratio compressor is used, compressor stall may occur under part load operation or under various other operating conditions such as, for example, during engine acceleration. Compressor stall is a condition which exists when the compression ratio across the compressor is greater than the compressor is capable of maintaining. To alleviate this condition in the lower portions of the operating speed range, it is desirable to vary the engine geometry to correspond to the operating speed of the engine. This can be accomplished by adjusting the positions of the compressor inlet guide vanes in accordance with the design requirements of the various operating speeds.

It is also known to those skilled in the art that the overall cycle efficiency of a gas turbine cycle depends in part on the temperature of the combustion products supplied to the turbine from the turbine nozzle diaphragm. In typical turbojet and turboshaft engines designed to operate at full load conditions, the turbine inlet temperature is substantially less than optimum when the engine is operating under part power conditions. Therefore, in order to increase the efficiency, it is desirable to increase the turbine inlet temperature at part power. It has been found that this can be accomplished by adjusting the positions of the vanes comprising the turbine nozzle to vary the flow area therethrough, the flow area being decreased under part power conditions to increase the turbine inlet temperature.

It is therefore a primary object of this invention to provide in a gas turbine engine improved structure for adjusting the fluid flow characteristics in accordance with the design requirements of various operating speeds.

Another object of this invention is to provide improved variable vane structure for optimizing engine cycle efficiency at part load operating conditions.

A further object of this invention is to provide relatively simple and dependable means for controlling the fluid flow characteristics which neither adds substantially to the expense of manufacturing the engine nor increases substantially the complexity of the engine.

Briefly stated, in accordance with an illustrated embodiment of the invention, either a compressor or a turbine is provided with a plurality of circumferentially spaced radially extending vanes, each of the vanes having axially spaced leading and trailing edge portions. Each vane has a flexible mid-portion which connects the leading and trailing edge portions. The leading edge portions of the vanes are rigidly supported in the engine in fixed positions, and an actuating means is connected to each of the trailing edge portions to move the trailing edge portions in substantially circumferential directions relative to the fixed leading edge portions. In this manner, the flow area through either the turbine nozzle or the compressor inlet guide vanes can be varied by moving only the trailing edge portion of each vane. In the illustrated embodiment of the invention, the mid-portion of each vane is comprised of a flexible convex wall and a concave wall having overlapping relatively movable segments, and the actuating means extends into the hollow interior of each vane.

While the novel features of this invention are set forth with particularity in the appended claims, the invention, both as to organization and content, will be better understood and appreciated, along with other objects and features thereof, from the following detailed description taken in conjunction with the drawing, in which:

FIG. 1 is a schematic sectional view of an axial flow gas turbine engine embodying this invention in both the turbine and compressor; and FIG. 2 is an enlarged view of the turbine portion of the engine illustrated by FIG. 1 showing in detail variable area turbine nozzle structure embodying this invention; and FIG. 3 is a view taken along line 3—3 of FIG. 2 showing a number of the vanes and illustrating the differences in nozzle flow area when the vanes are in their open and closed positions;

FIG. 4 is a view taken along line 4—4 of FIG. 2 illustrating a suitable actuating mechanism for moving the vanes between their various positions; and FIG. 5 is a view taken along line 3—3 of FIG. 2 showing one of the vanes comprising the turbine nozzle, the vane being shown in its open position; and FIG. 6 is a view similar to FIG. 3 showing the vane in its closed position.

Referring to the drawing, and particularly to FIG. 1, a gas turbine engine indicated generally by a numeral 10 is illustrated. The engine 10 has a cylindrical casing 11 having mounted therein in axially spaced relation a compressor 12, a combustor 13, a turbine 14, and an exhaust nozzle 15. The turbine rotor 16 is mechanically connected to and drives the compressor rotor 17 by a rotatably mounted shaft 18. After driving the turbine 14 and, hence, the compressor 12, the high energy products of combustion are discharged from the exhaust nozzle 15 as a high velocity jet to provide thrust. The compressor 12 is of the high compression ratio type in order to provide maximum thrust under full speed operating conditions. In order to alleviate stall characteristics and to provide proper turbine inlet temperatures under other operating conditions, the engine 10 is provided with adjustable compressor inlet guide vanes 19 and an adjustable nozzle diaphragm 20, the adjustable stator structures being constructed in accordance with this invention in order to attain the desired objects enumerated above. In the description which follows, the stator structure comprising the nozzle diaphragm 20 is described in detail; it will, however, occur to those skilled in the art that the compressor inlet guide vanes 19 could have been described in detail since the mechanical structure of the various stator elements is substantially identical.

Turning now to FIGS. 2–4, it will be seen that the nozzle diaphragm 20 is comprised of a plurality of circumferentially spaced radially extending vanes 21 traversing an annular flow passageway formed between inner and outer cylindrical concentric shroud members 22 and 23, respectively. Combustion products at high temperature and pressure are supplied to the nozzle diaphragm 20 from the combustor 13 as indicated by the arrow of FIG. 2, the combustion products then being directed from the nozzle diaphragm as high velocity jets against a row of turbine buckets 24 peripherally mounted on the turbine rotor 16.

The construction of the individual vanes 21 comprising the nozzle diaphragm 20 will now be described, FIGS. 2, 5, and 6 best showing the details of construction. Each vane 21 has axially spaced leading and trailing edge portions 30 and 31, respectively. The vanes 21 have an aerodynamic airfoil shape, the leading edge 30 being rather blunt and the trailing edge 31 being tapered as best shown by FIGS. 5 and 6. A convex wall 32 and a concave wall comprised of overlapping sliding wall segments 33 and 34 join the leading edge portion 30 and the trailing edge portion 31 to develop the aerodynamic airfoil shape. The illustrated vanes 21 are preferably fabricated from sheet metal, the leading and trailing edge portions 30 and 31 and the wall segment 34 connected to the trailing edge portion 31 being relatively heavy. In practice, the material selected for these elements will be heavy enough to assure that the elements are substantially rigid during machine operation. The material used for the wall 32 and the wall segment 33 is relatively light-weight and flexible. The elements just described form, in addition to the aerodynamic airfoil shape, an envelope enclosing a radially extending cavity 35 in the interior of the vane 21. Within the cavity 35, a spring member 36 biases the wall segment 34 outwardly against the wall segment 33. During machine operation, fluid pressure acting on the outer surface of the flexible wall segment 33 biases the segment 33 inwardly against the wall segment 34. In this manner, the two wall segments form a substantially continuous concave wall surface during turbine operation.

As illustrated by FIG. 2, the leading edge portion 30 is longer than the remaining vane elements, and the leading edge portion 30 is secured to the inner and outer shroud members 22 and 23 in a suitable manner such as, for example, by welds 25. If desired, the leading edge portion 30 may extend through the shroud members as illustrated; the only requirement however is that the leading edge portion 30 be secured to the shroud members 22 and 23 to form a unitary rigid structure therewith. A cooling air opening 37 may be provided if desired in one or both of the shroud members 22 and 23 to permit entry of cooling air into the interior vane cavity 35, the flow of cooling air as indicated by the arrows being supplied from a compressor bleed opening (not shown). Means (not shown) can be provided within the interior cavity 35 to direct the cooling air in a desired manner to accomplish the cooling function.

The trailing edge portion 31, flexible wall 32, and the wall segments 33 and 34 have lengths just slightly less than the radial distance between the inner and outer shroud members 22 and 23, small clearance spaces 38 thereby being formed between these vane elements and the shroud members. As a practical matter, the clearance spaces 38 are made as small as possible so that leakage can be substantially prevented and, therefore, high turbine efficiency maintained. At this point, it is obvious that the composite nozzle diaphragm 20 has a rigid portion formed by the leading edge portions 30 of the shroud members and a variable portion formed by the remaining vane elements. By selectively varying the positions of the trailing edge portions 31 of the vanes 21, it is possible to vary the throat area, or flow area, in a predetermined manner and thus control the turbine inlet temperature. As best illustrated by FIG. 3, the vanes 21 may be adjusted between an open position shown by solid lines and a closed position shown by broken lines. In addition, FIG. 5 illustrates the open position, and FIG. 6 illustrates the closed position. The available flow area in the open position is proportional to the throat distance A, and the available flow area in the closed position is proportional to the smaller throat distance A'. By increasing the throat area, the temperature of the combustion products supplied to the turbine buckets 24 is reduced.

One form of suitable means for adjusting the vane positions will now be described. As best shown in FIGS. 2, 5, and 6, a radially extending rod 40 extends through the interior cavity 35 of each vane 21. The rod 40 is pivotally mounted in suitable bearings 41 and 42 at the ends of the vane 21. At least one plate 43 is slidably received in a slot 44 in the rod 40 and extends into contact with the trailing edge portion 31 of the vane 21. By rotating the rod 40, the plate 43 moves the trailing edge portion 31 in a substantially circumferential direction relative to the leading edge portion 30.

The sliding contact between the plate 43 and the rod 40 relieves stresses which might otherwise be imposed on the flexible wall 32. To assure that binding does not occur between the plate 43 and the slot 44, positive cam action may be provided between the rod 40 and the wall segment 34 as shown at 45.

It will be appreciated by those skilled in the art that alternative actuating mechanisms can be utilized to move the trailing edge portion 31 of the vane 21. For example, the plate 43 could be rigidly connected to the rod 40 such that there is no sliding contact between the plate 43 and the rod 40. In such an event, stress relief could be provided by sliding contact between the plate 43 and the trailing edge portion 31 of the vane 21. Other alternatives will occur to those skilled in the art.

As shown by FIGS. 2 and 4, a lever 50 is secured to the outer end of each of the rods 40, the levers 50 being slidably received in slots 51 in an annular unison ring 52 circumferentially spaced about the nozzle diaphragm 20. A slight circumferential movement of the unison ring 52 causes rotation of the levers 50 and the rods 40 and, hence, adjustment of the vanes 21. The unison ring 52 is connected to an actuator by a bellcrank mechanism 53 and a link 54 which is reciprocated by the actuator. Other possible actuating arrangements for adjusting the positions of the trailing edge portions 31 of the vanes 21 will occur to those skilled in the art.

As pointed out previously, the foregoing discussion has been directed to a turbine nozzle diaphragm 20 constructed in accordance with the present invention, the invention being equally applicable to the compressor inlet guide vanes 19 of FIG. 1. In accordance with the invention, the positions of the trailing edges of the compressor inlet guide vanes 19 are varied to provide the proper flow area under various operating conditions and speeds.

From the foregoing, it will be appreciated that the vane structure of this invention provides means for adjusting the fluid flow characteristics in a gas turbine engine in accordance with design requirements of various operating speeds.

It will be understood that the invention is not limited to the specific details of construction and arrangement of the embodiment illustrated and described herein since changes and modifications will be obvious to those skilled in the art. It is therefore intended to cover in the appended claims all such changes and modifications which may occur to those skilled in the art without departing from the true spirit and scope of the invention.

What is claimed as new and desired to secure by Letters Patent of the United States is:

1. In an axial flow compressor or turbine, stator structure comprising:
    (a) inner and outer concentric shroud members forming an annular passageway therebetween,
    (b) a plurality of circumferentially spaced radially extending vanes traversing said annular passageway,
    (c) each of said vanes having axially spaced leading and trailing edge portions,
    (d) the leading edge portions of said vanes secured to said inner and outer shroud members to form a fixed rigid structure therewith,
    (e) each of said vanes having a flexible convex wall connecting said leading and trailing edge portions,
    (f) a first flexible wall segment connected to said leading edge portion and a second relatively stiff wall segment connected to said trailing edge portion,
    (g) said first wall segment overlapping said second wall segment to form therewith a continuous concave wall surface joining said leading and trailing edge portions,
    (h) said convex wall and said first and second wall segments defining with said leading and trailing edge portions an elongated radially extending cavity within each of said vanes,
    (i) a plurality of rotatable rods each extending radially into one of said vane cavities,
    (j) means within each of said cavities joined to said rods for rotation therewith and connected to both said trailing edge portions and said second wall segment such that rotation of said rods causes substantially uniform circumferential movement of said trailing edge portions relative to said leading edge portions, said means slidably interconnecting said rods and said trailing edge portions,
    (k) and means connected to said rods for rotating said rods to cause desired movement of said trailing edge portions relative to said fixed leading edge portions.

2. In an axial flow compressor or turbine, stator structure comprising:
    (a) inner and outer concentric shroud members forming an annular passageway therebetween,
    (b) a plurality of circumferentially spaced radially extending vanes traversing said annular passageway,
    (c) each of said vanes having axially spaced leading and trailing edge portions,
    (d) the leading edge portions of said vanes secured to said inner and outer shroud members to form a fixed rigid structure therewith,
    (e) each of said vanes having a flexible convex wall connecting said leading and trailing edge portions,
    (f) a first flexible wall segment connected to said leading edge portion and a second relatively stiff wall segment connected to said trailing edge portion,
    (g) said first wall segment overlapping said second wall segment,
    (h) spring means biasing said second wall segment outwardly into contact with said first wall segment to form therewith a continuous concave wall surface joining said leading and trailing edge portions,
    (i) said convex wall and said first and second wall segments defining with said leading and trailing edge portions an elongated radially extending cavity within each of said vanes,
    (j) a plurality of rotatable rods each extending radially into one of said vane cavities,
    (k) means within each of said cavities joined to said rods for rotation therewith and connected to both said trailing edge portion and said second wall segment such that rotation of said rods causes substantially uniform circumferential movement of said trailing edge portion relative to said leading edge portions,
    (l) and means for rotating said rods to cause desired movement of said trailing edge portions relative to said fixed leading edge portions.

References Cited by the Examiner

UNITED STATES PATENTS

| 2,126,813 | 8/1938 | Reid | 170—160.5 X |
|---|---|---|---|
| 2,337,861 | 12/1943 | Adamtchik. | |
| 2,914,241 | 11/1959 | Novak | 230—114 |
| 2,932,440 | 4/1960 | Hemsworth | 230—114 |
| 2,994,509 | 8/1961 | Walker | 253—59 X |
| 3,144,983 | 8/1964 | Ljungstrom et al. | |
| 3,146,626 | 9/1964 | Hanselmann | 230—114 X |

FOREIGN PATENTS

| 100,913 | 9/1925 | Austria. |
|---|---|---|
| 882,017 | 2/1943 | France. |
| 315,861 | 11/1914 | Germany. |
| 855,224 | 11/1952 | Germany. |
| 880,590 | 10/1961 | Great Britain. |

SAMUEL LEVINE, *Primary Examiner.*

JULIUS E. WEST, *Examiner.*